United States Patent [19]

Ando

[11] Patent Number: 5,404,533
[45] Date of Patent: Apr. 4, 1995

[54] LANGUAGE PROCESSING SYSTEM FOR CONVERTING A SOURCE PROGRAM INTO A COMPUTER EXECUTABLE MACHINE LANGUAGE

[75] Inventor: Yoshinari Ando, Tokyo, Japan
[73] Assignee: NEC Corporation, Tokyo, Japan
[21] Appl. No.: 191,095
[22] Filed: Feb. 4, 1994

[30] Foreign Application Priority Data

Feb. 5, 1993 [JP] Japan .................................. 5-018306

[51] Int. Cl.6 .............................................. G06F 9/45
[52] U.S. Cl. .............................. 395/700; 364/DIG. 1;
364/280.4; 364/254.3
[58] Field of Search ............................. 395/425, 700;
364/DIG. 1 MS File, DIG. 2 MS File

[56] References Cited

U.S. PATENT DOCUMENTS 5,129,070  7/1992  Dorotte ........................ 364/DIG. 1
5,201,050  4/1993  McKeeman et al. .............. 395/700
5,323,489  6/1994  Bird ............................. 364/DIG. 1

Primary Examiner—Thomas M. Heckler
Attorney, Agent, or Firm—Foley & Lardner

[57] ABSTRACT

A language processing system for converting a source program described by a program language into a computer executable machine language for a computer system which has a data memory space divided into a plurality of banks. The system includes a bank information storage portion for storing information of the banks, a bank information setting portion for identifying the bank switching instruction and for storing a bank number designated by the bank switching instruction, a bank information discriminating portion for reading out the content of the bank information and making a comparison between the bank number identified by the content of the bank information storage portion and the bank number designated by an instruction statement when the statement is to operate with the content of the data memory, a bank switching instruction generating portion for generating a bank switching instruction to switch the bank number to the bank number designated by the instruction statement when an inconsistency between bank numbers is identified, and a converting portion for converting the statement of the source program and the generated bank switching instruction into machine language.

9 Claims, 8 Drawing Sheets

FIG.4

501 — IF    ZZZBANK = −1

502 — ——BANKn

503 — ELSE

504 — —IF   ZZZBANK ≠ n

505 — ——BANKn

506 — —ENDIF

507 — ENDIF

508 — MOV  01H,1

601—BANKm

⋮

501— IF     ZZZBANK = −1

502———BANKn

503—ELSE

504— IF     ZZZBANK ≠ n

505———BANKn

506—ENDIF

507—ENDIF

508—MOV    01H,1

⋮

LANGUAGE PROCESSING SYSTEM FOR CONVERTING A SOURCE PROGRAM INTO A COMPUTER EXECUTABLE MACHINE LANGUAGE

BACKGROUND OF THE INVENTION

1. Field of the Invention

The present invention relates generally to a language processing system for converting a source program into a computer executable machine language. More specifically, the invention relates to a language processing system which converts a source program described by a program language and including a bank switching instruction for switching the banks by designating bank numbers, into a computer executable machine language, for a computer system which has a data memory space divided into a plurality of banks and executes operations for data memory designated by a bank number and an address in the back designated by the bank number.

2. Description of the Related Art

In microcomputers, there are provided data memories for storing data which is variable upon arithmetic control. The data memory is utilized as a work area for storing input data and results of arithmetic operation of data. In a case where the address of the data memory to be designated by an operand of the program instruction is n bits in length, the data memory space to be accessed at one time becomes $2^n$ nibbles. In order to expand the space of the data memory to be accessed at one time, a principle of the bank has been proposed.

For instance, when the data memory is to be accessed, by adding m bits of the bank to n bits of the address, it becomes possible to access the address space of n+m bits.

Therefore, the data memory is divided into $2^m$ banks. Each bank has the size of $2^n$ nibbles. Therefore, the size of the data memory to be installed becomes $2^n \times 2^m$.

In such a microcomputer, the data memory space expanded by the bank can be operated. However, the data memory space to be directly accessed by the instruction is limited in one bank (the data memory space of $2^n$ nibbles in the foregoing example). Accordingly, in the machine language instruction to operate the content on the data memory, the content of the address of the specific bank is operated by designating with the bank number and the address.

On the other hand, a bank register is provided in the system of the microcomputer for setting the current bank number so as to avoid inconsistency between the bank number at the system side and the bank number designated by the instruction by setting the bank number to be operated by the machine language instruction in the bank register in advance of execution of the machine language instruction for operating the content on the data memory. It is typical to provide a dedicated bank switching instruction (BANKn) for setting the bank number to the bank register.

On the other hand, in the source program, there is contained a branch instruction having a function for branching to an arbitrary other target address (hereinafter referred to as a "label") from the current instruction. In order to identify a branching destination, a label is set.

The instruction described by the source program contains an instruction for operating the content of the address on the data memory. When contents of addresses on a plurality of banks (when numbers of the banks are different) are operated in one program, the instruction in the source program becomes as illustrated in FIG. 9.

With the instruction BANKn1001 for setting the bank number, the bank number of the data memory to be operated by the instruction 1002 is adapted to operate the content of the subsequent address of the data memory. When the instruction 1004 for operating the content on the data memory follows, it is possible that the addresses to be operated by the instructions 1002 and 1004 are not in the same bank. Therefore, it becomes necessary to insert the instruction BANKm1003 for setting the bank number of the data memory to be operated by the instruction 1004.

However, if the bank numbers to be operated by the instruction 1002 and the instruction 1004 are different (i.e., n≠m), the instruction BANKm1003 is always required, whereas if the bank numbers are the same, the instruction BANKm1003 becomes unnecessary.

In the conventional language processing system to convert the source program into the machine language, the system simply converts the source program into the machine language on a line by line basis. Therefore, even when an unnecessary back switching instruction is contained in the source program, it is inherently converted into machine language to make the execution program unnecessarily long.

SUMMARY OF THE INVENTION

Therefore, it is an object of the present invention to provide a language processing system which can realize bank switching with a minimum bank switching instruction and whereby the system can simplify the execution program conversion into machine language by making a judgement as to the necessity of bank switching at a step preceding an instruction in a source program for operating a content of a data memory and thus generate the bank switching instruction only when bank switching is really required.

Another object of the invention is to provide a language processing system which can realize bank switching with a minimum bank switching instruction and avoid a discrepancy of the bank number otherwise caused by branching of the process by generating the bank switching instruction while making a judgement of the possibility of the occurrence of a discrepancy of the bank number caused by branching of the process when a label indicative of the destination of branching of a branching instruction is contained in the source program.

In order to accomplish the above-mentioned and other objects, according to one aspect of the invention, a language processing system is provided for converting a source program described by a program language and including a bank switching instruction for switching the banks by designating bank numbers, into a computer executable machine language, for a computer system which has a data memory space divided into a plurality of banks and executes operations for data memory designated by a bank number and an address in the bank designated by the bank number, the system comprises:

means for reading a statement of the source program;

bank information storage means for storing information relating to switching of the banks;

bank information setting means for discriminating whether the read statement is the bank switching instruction for storing a bank number designated by the bank switching instruction when the statement is the bank switching instruction;

bank information discriminating means for reading out the content in the bank information storing means and making discrimination between the bank number identified by the content of the bank information storage means and the bank number designated by an instruction statement when the statement is the instruction statement for operating the content of the data memory;

bank switching instruction generating means for generating the bank switching instruction for switching the bank number to the bank number designated by the instruction statement when inconsistency of bank number is discriminated; and converting means for converting the statement of the source program and the generated bank switching instruction into the machine language.

According to another aspect of the invention, a language processing system is provided for converting a source program described by a program language and including a bank switching instruction for switching the banks by designating bank numbers and a branching instruction for branching to an arbitrary label as a target address, into a computer executable machine language, for a computer system which has a data memory space divided into a plurality of banks and executes operations for data memory designated by a bank number and an address in the bank designated by the bank number, the system comprising:

means for reading a statement of the source program;

bank information storage means for storing information relating to switching of the banks;

bank information setting means for discriminating whether the read statement is the bank switching instruction or the label for storing a bank number designated by the bank switching instruction when the statement is the bank switching instruction and for storing a specific value other than the bank number when the statement is the label;

bank information discriminating means for reading out the content in the bank information storing means and making discrimination whether the bank number identified by the content of the bank information storage means and the bank number designated by an instruction statement when the statement is the instruction statement for operating the content of the data memory;

bank switching instruction generating means for generating the bank switching instruction for switching the bank number to the bank number designated by the instruction statement when inconsistency of bank number is discriminated; and converting means for converting the statement of the source program and the generated bank switching instruction into the machine language.

In both cases, the language processing system may further comprise:

a symbol storage portion storing a symbol name and the value thereof;

wherein the bank information storage means is set in the symbol storage portion as a specific symbol.

In the preferred construction, the bank information storage means is a dedicated storage area for storing the bank information. Also, the bank information discriminating means and the bank switching instruction generating means may be realized by executing conditional assembly pseudo instructions described in the source program.

According to another aspect of the invention, a language processing method is provided for converting a source program described by a program language and including a bank switching instruction for switching the banks by designating bank numbers, into a computer executable machine language, for a computer system which has a data memory space divided into a plurality of banks and executes operations for data memory designated by a bank number and an address in the bank designated by the bank number, said method comprising the steps of:

reading a statement of said source program;

storing information relating to switching of said banks;

discriminating whether the read statement is said bank switching instruction and storing a bank number designated by the bank switching instruction when the statement is the bank switching instruction;

reading out the content in said bank information and making a discrimination between the bank number identified by the content of said bank information and the bank number designated by an instruction statement when the statement is said instruction statement for operating the content of said data memory;

generating the bank switching instruction for switching the bank number to the bank number designated by said instruction statement when inconsistency of bank number is discriminated; and converting the statement of said source program and said generated bank switching instruction into the machine language.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is an illustration showing one example of a practical source program described by a program language;

FIG. 5 is an illustration showing one example of the source program, in which a bank switching instruction message is described before a conditional assembly pseudo instruction shown in FIG. 4;

DESCRIPTION OF THE INVENTION

Figure 1:
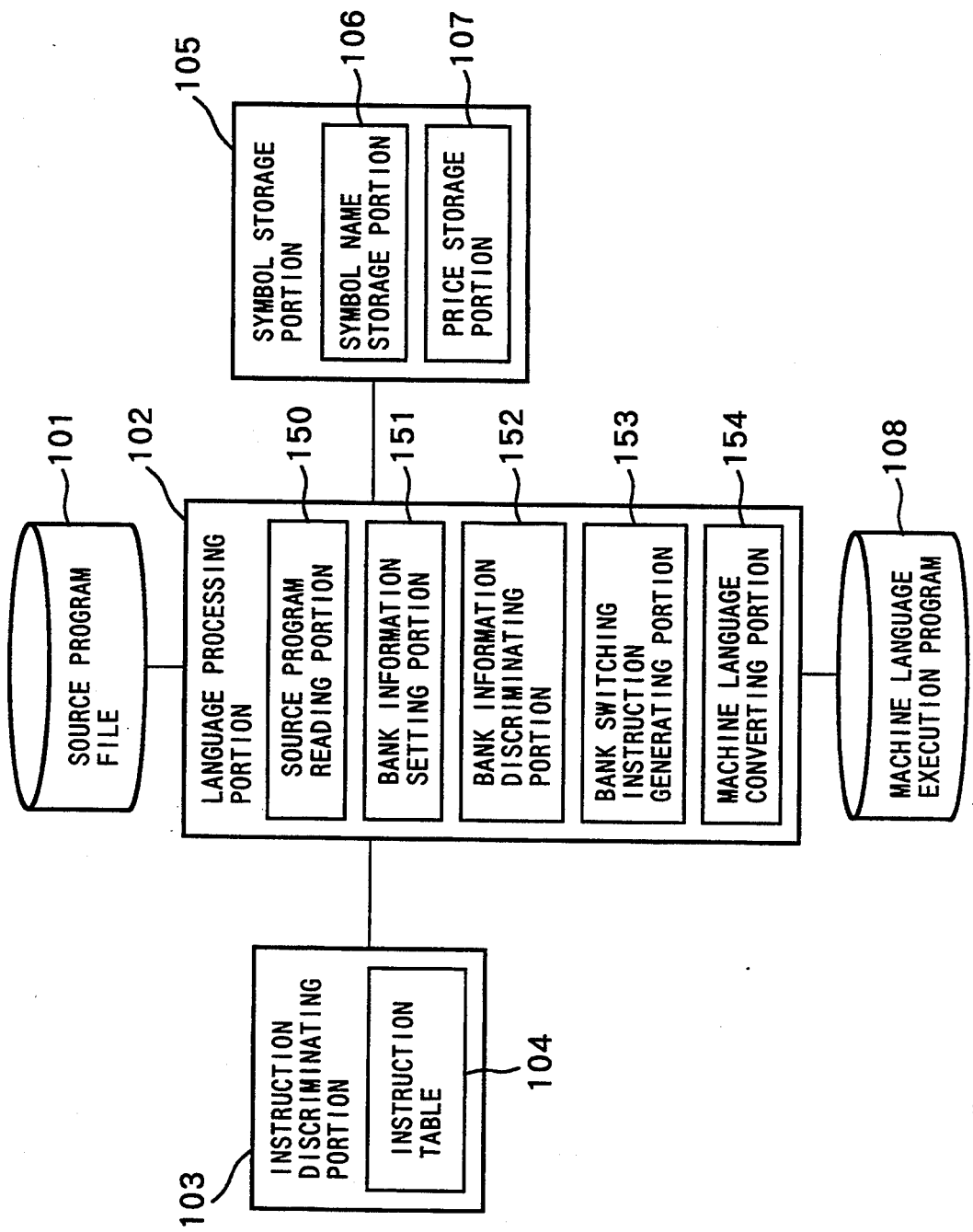
FIG. 1 is a block diagram explanatorily illustrating the first embodiment of a language processing system according to the present invention.

The preferred embodiments of the invention will be discussed hereinafter with reference to the accompanying drawings. FIG. 1 is a block diagram showing the first embodiment of a language processing system according to the present invention. The shown language processing system is adapted to convert a source program which is described by a program language and includes a bank switching instruction for switching banks by designating a bank number and an address in the bank designated by the bank number and a branching instruction for branching to an arbitrary label (target address), into a computer executable machine language, for a computer system which has a data memory space divided into a plurality of banks and executes operation for the data memory by designating the bank number and the address in the bank designated by the bank number.

The shown embodiment of the language processing system comprises a source program file 101 storing the source program as an object for conversion into an execution program in the machine language, a language processing portion 102 reading each line of the source program on a line by line basis and performing a conversion process into machine language, an instruction discriminating portion 103 for discriminating whether the line of the source program currently read by the language processing portion 102 is an instruction line, a symbol storage portion 105 for storing a symbol (keyword) defined in the source program, and a machine language execution program file 108 for storing the result of the conversion process into machine language.

As shown, the language processing portion 102 has a source program reading portion 150 for reading the source program on a line by line basis, a bank information setting portion 151 for storing the symbol ZZZBANK set by the symbol storage portion 105 in a bank information, a bank information discriminating portion 152 for discriminating the value of the symbol ZZZBANK of the symbol storage portion 105, a bank switching instruction generating portion 153 for generating a bank switching instruction depending upon the result of the discrimination of the bank information discriminating portion, and a machine language converting portion 154 for performing the conversion process to convert the source program into machine language.

The instruction discriminating portion 103 includes a mnemonic table 104 of the instructions to be used in the source program. The instruction discriminating portion 103 discriminates whether the read statement is an instruction and what kind of instruction it is by making reference to the instruction mnemonic table 104 of the instructions.

The symbol storage portion 105 includes a symbol name storage portion 106 storing names of the symbols defined in the source program, and a price storage portion storing the values corresponding to the symbol name.

Figure 2:
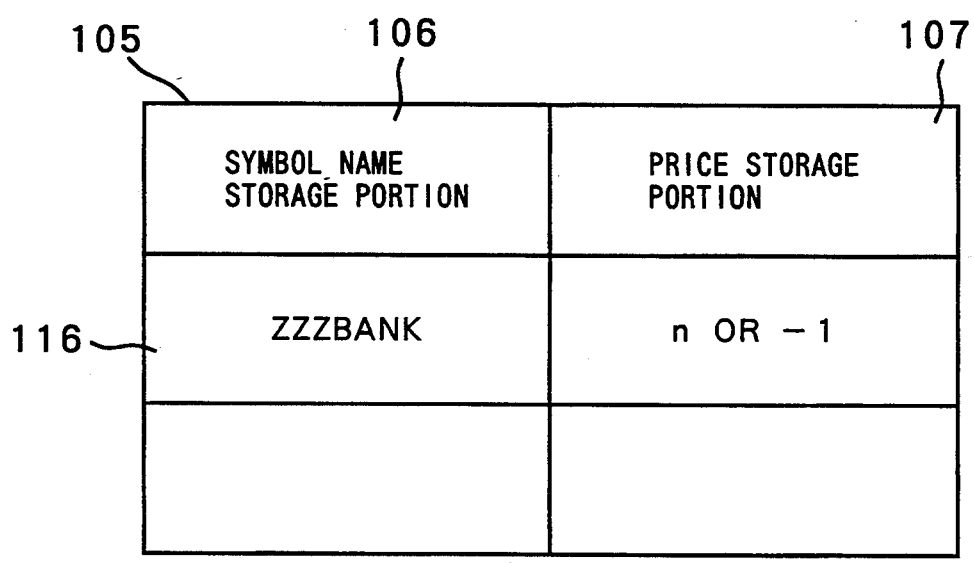
FIG. 2 is an illustration showing a construction of a symbol storage portion in the first embodiment of the language processing system.

The internal structure of the symbol storage portion 105 is illustrated in FIG. 2. As shown in FIG. 2, in the symbol name storage portion 106 and the price storage portion 107, the symbols and prices are stored in such a manner that each price is associated with one of the symbols. Therefore, when reference is made to the symbol by the symbol storage portion 105, it becomes possible to read out the value corresponding to the specific name by identifying the symbol name. The value stored in the price storage portion 107 is possible to be varied to an arbitrary value by the assembly pseudo language.

In this embodiment, a symbol (symbol name: ZZZBANK) for setting an information (bank information) in connection with switching banks is assigned to a part of the symbol storage portion 105. In a price storage portion 107 corresponding to this symbol ZZZBANK 116, the bank number or "−1" is stored by the bank information setting portion 151.

The bank information setting portion 151 stores the bank number designated by the bank switching instruction in the price storage portion 107 corresponding to the symbol ZZZBANK 116 when the instruction read from the source program is the bank switching instruction, or when the bank switching instruction is generated by the bank switching instruction generating portion 153. On the other hand, when the line read from the source program is the label line, value "−1" is stored in the price storage portion 107 corresponding to the symbol ZZZBANK 116.

If the bank switching instruction is not present between the currently processed line and the label line, or when the label line is reached as the result of branching from another process, it is possible that the bank numbers set in the BANK register can be different before and after branching. In order to indicate the possibility of inconsistency of the bank number before and after branching, "−1" is stored in the price storage portion 107 in case of the label line.

Figure 3:
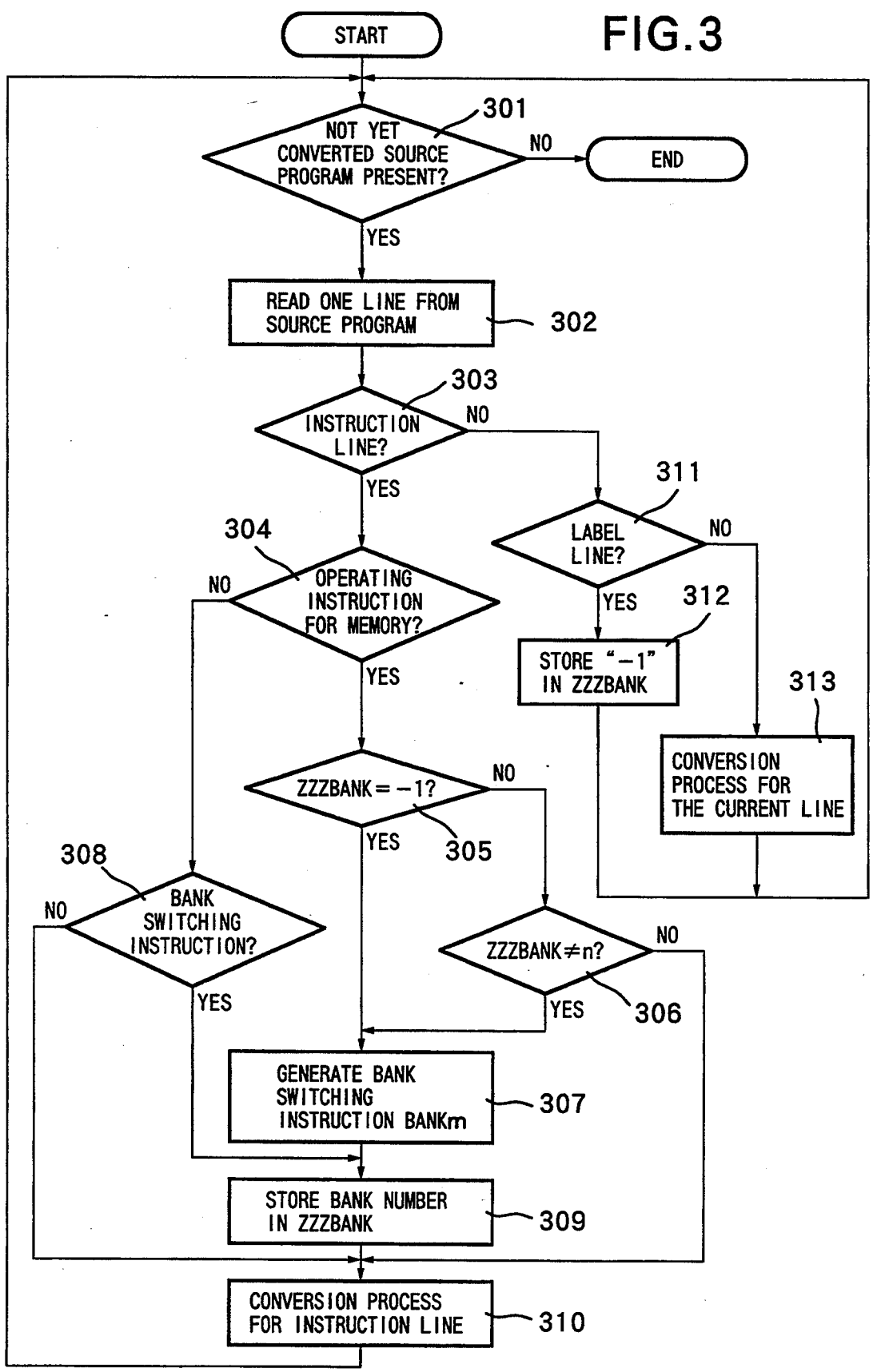
FIG. 3 is a flowchart showing a content of a process in the first embodiment of the language processing system.

Discussion will be given for the flow of the process of the shown embodiment of the language processing system with reference to FIG. 3. At first, the source program reading portion 150 makes a judgement as to whether a line is present for which the converting process into the machine language is not yet completed, namely whether a line which can be read out is present (step 301). If a not yet converted line is present, one line of the statement is read from the source file 101 (step 302).

The read statement is discriminated whether it is an instruction line by the instruction discriminating portion 103 (step 303). This discrimination is performed with reference to the instruction table 104. If the read statement is an instruction line, further discrimination is made as to whether the instruction is to operate the data (content designated by the address) on the data memory (step 304).

When the read statement is an instruction for operating the data on the data memory, the bank information discriminating portion 152 performs discrimination as to the value stored in the price storage portion 107 corresponding to the symbol ZZZBANK 116 defined by the language processing system and stored in the symbol storage portion 105 (step 305). If the value stored in the price storage portion 107 is other than "−1", the bank information discriminating portion 152 performs discrimination as to whether the bank number (n) stored in the price storage portion 107 is consistent with the bank number (m) designated by the instruction for operating data on the data memory (step 306).

When the value of the price storage portion 107 is "−1" as checked at the step 305 or when the bank numbers are not consistent to each other as checked at the step 306, the bank switching instruction BANKm is generated for switching the bank number to that designated by the instruction for operating the data (step 307). Subsequently, the bank number designated by the generated bank switching instruction is stored in the price storage portion 107 corresponding to the symbol ZZZBANK 116 (step 309). Then, the generated bank switching instruction and a subsequent instruction for operating the data on the data memory are converted into machine language (step 310).

When both bank numbers are consistent as checked at the step 306, the bank switching instruction is never generated. Then, the instruction for operating the data on the data memory is converted into the machine language.

On the other hand, when the instruction is not for operating the data on the data memory as checked at the step 304, the instruction discriminating portion 103 performs discrimination as whether the instruction is a bank switching instruction (step 308). If the instruction is a bank switching instruction, the bank number "n" designated by the bank switching instruction is stored in the price storage portion 107 corresponding to the symbol ZZZBANK defined by the language processing system and stored in the symbol storage portion 105 (step 309). Then, the bank switching instruction is converted into machine language (step 310).

When discrimination is made that the instruction is not a bank switching instruction as checked at the step 308, the instruction is converted into machine language (step 310).

When the instruction is not the instruction line as checked at the step 303, discrimination is made as to whether the statement is the label line or not (step 311). If the statement is the label line, the value "−1" is stored in the price storage portion 107 corresponding to the symbol ZZZBANK 116 stored in the symbol storage portion 105 (step 312). If the statement is not the label line, the current line is converted into machine language. The foregoing processes are repeated for all lines of the source program.

The bank information discriminating function and bank switching instruction generating function (steps 305 to 307 of FIG. 3) provided for the language processing portion 102 can be realized in the source program employing a conditional assembly pseudo instruction, for example. One example of the practical source program described by the program language is illustrated in FIG. 4.

In the source program of FIG. 4, the instruction statement 501 is the conditional assembly pseudo instruction for discriminating whether the content of the symbol ZZZBANK 116 is "−1" or not. On the other hand, the instruction statement 504 is the conditional assembly pseudo instruction for discriminating whether the bank number stored in the symbol ZZZBANK 116 is consistent with the bank number designated by the instruction statement 503 for operating the content of the data memory. Also, the instruction statements 503, 506 and 507 are also the conditional assembly pseudo instructions. These assembly pseudo instructions are executed only during conversion into machine language and are not converted into machine language.

In the language processing portion 102 of the shown embodiment of the language processing system, the instruction statements 501 to 507 are inserted before the instruction statement 508 for operating the content of the data memory as one block. Here, the instruction statements 502 and 505 are bank switching instructions.

In the instruction statement 501, when the condition is true (symbol ZZZBANK = −1), the instruction statement 502 is executed. On the other hand, when the condition is false (symbol ZZZBANK ≠ 1), the instruction statement 502 (bank switching instruction) is not executed and the instruction statement 503 is executed. In the instruction statement 504, when the condition is true (the bank number stored in the symbol ZZZBANK is not consistent with the bank number designated by the instruction statement for operating the content of the data memory), the instruction statement 505 is executed. If the condition is false (the bank number stored in the symbol ZZZBANK is consistent with the bank number designated by the instruction statement for operating the content of the data memory), the instruction statement before the instruction statement 506 is never executed. Accordingly, if the condition is false at the instruction statement 501 and the condition is false at the instruction statement 504, the bank switching instruction is not converted into machine language.

Next, one example of the source program in the case where the bank switching instruction statement 601 is described before the conditional assembly pseudo instruction 501 shown in FIG. 4, is illustrated in FIG. 5. It should be noted that no label line is present between the instruction statements 601 and 501.

As a result of discrimination of the instruction statement 601, it is discriminated as a bank switching instruction. Therefore, the bank number m designated by the bank switching instruction is stored in the price storage portion 107 corresponding to the symbol ZZZBANK stored in the symbol storage portion 105.

In this source program, since there is no label between instruction statements 601 and 501, the conditional assembly pseudo instruction 501 becomes false (the value of the symbol ZZZBANK is not "−1"), the bank switching instruction 502 is not developed (not converted into the machine language).

Since the instruction statement 501 becomes false, the instructions 503 to 507 are executed. At the conditional assembly pseudo instruction 504 a check is performed to determine whether the value "m" stored in the symbol ZZZBANK is the same as the bank number n to be operated by the instruction statement 508. If they are not the same, it becomes necessary to switch the bank number to "n". Therefore, the bank switching instruction of the instruction statement 505 is developed and thus converted into machine language. On the other hand, if the bank numbers are consistent with each other, the bank switching instruction of the instruction statement 505 is not developed.

As set forth above, according to the shown embodiment, discrimination is made as to whether bank switching is necessary before the instruction statement for operating the content of the designated address on the data memory so that the bank switching instruction is generated only when the bank switching is indeed required. Therefore, the bank switching can be realized with the minimum number of instructions to permit simplification of the execution program converted into machine language.

Figure 6:
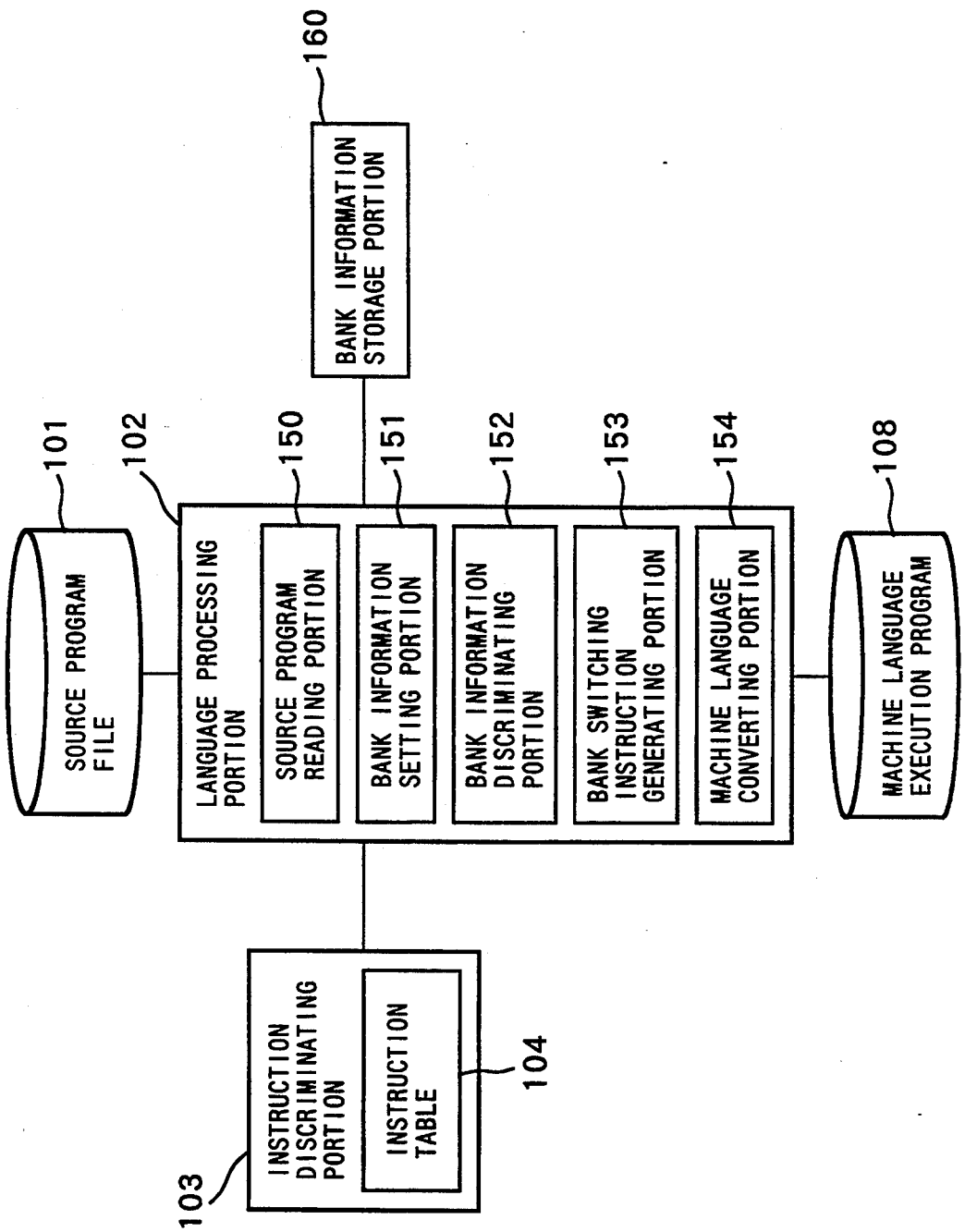
FIG. 6 is a block diagram showing a construction of the second embodiment of the language processing system according to the present invention.

Next, the second embodiment of the language processing system according to the present invention will be discussed with reference to FIG. 6. In the second embodiment, instead of setting the bank information of the symbol as in the first embodiment, a dedicated bank information storage portion 160 for storing the bank information is provided. With employing the dedicated bank information storage portion 160, it becomes impossible to arbitrarily make reference to the bank information by a programmer. Other construction is the same as that of the first embodiment.

The bank information storage portion 160 stores the bank number designated by the bank switching instruction when the statement in the source program is the bank switching instruction and stores the value "−1" when the statement is the label line.

Figure 7:
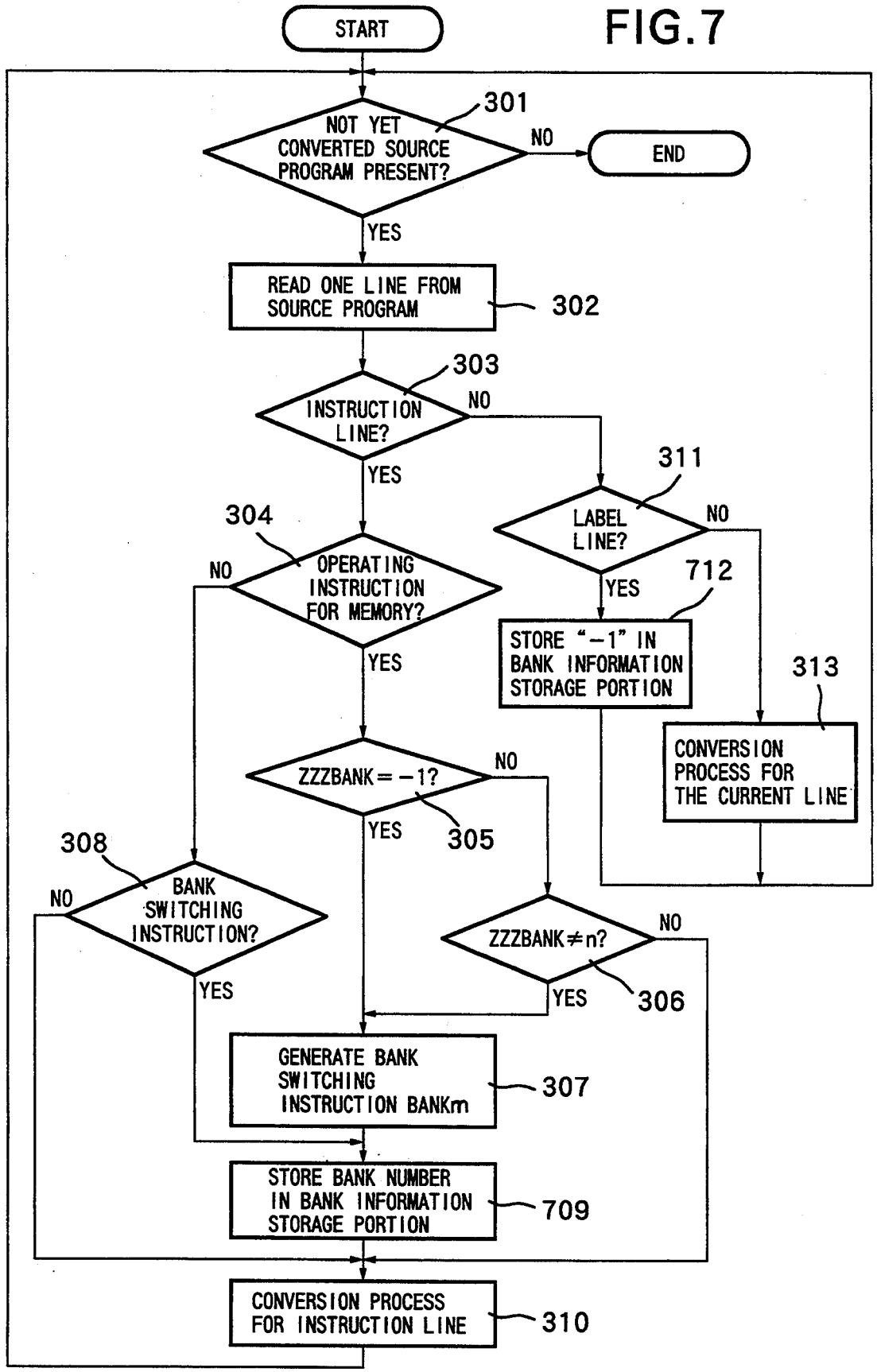
FIG. 7 is a flowchart showing a content of a process to be performed by the second embodiment of the language processing system.
Figure 8:
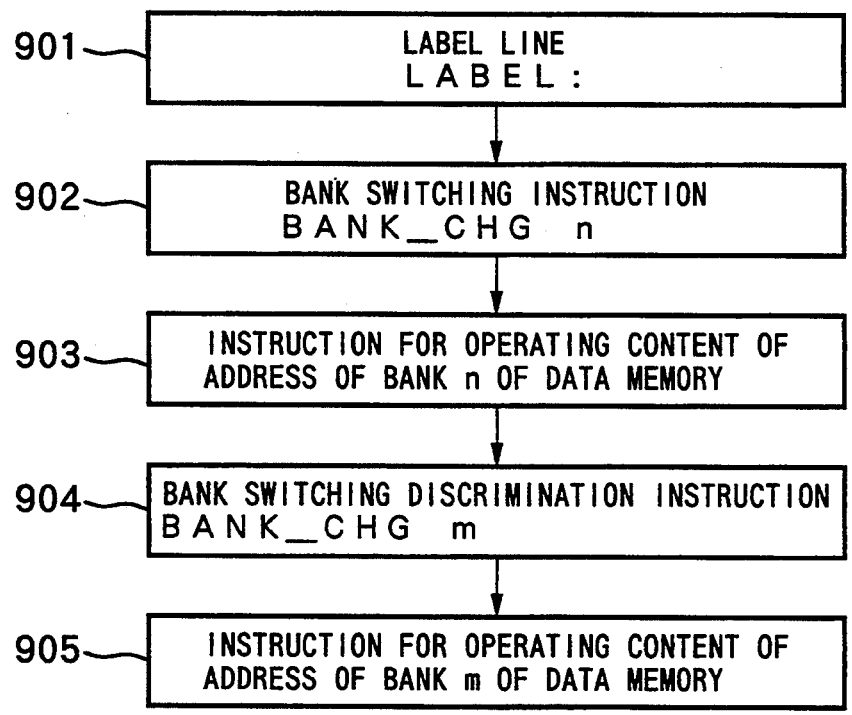
FIG. 8 is an explanatory illustration showing a process employing a dedicated bank switching judgement instruction to be executed with reference to a content in a bank number storage portion for making judgement for bank switching.
Figure 9:
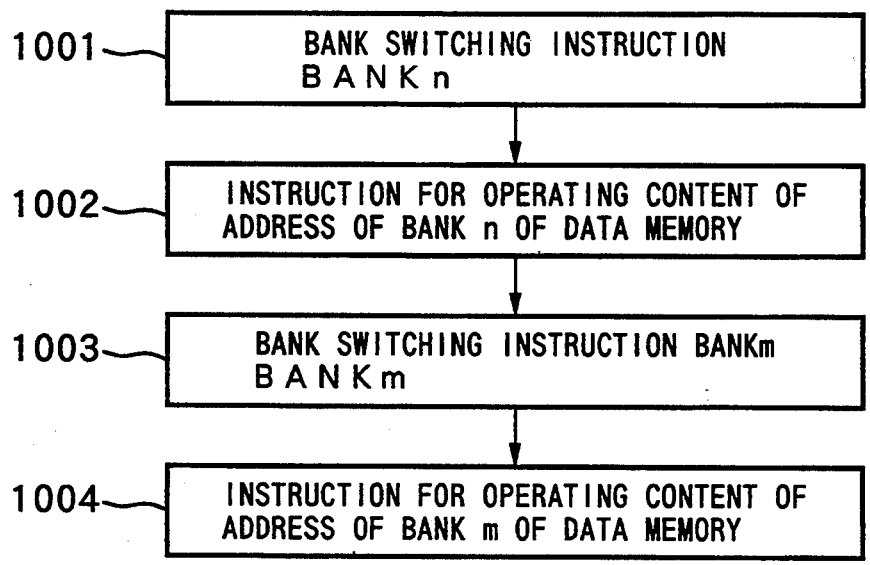
FIG. 9 is an illustration showing an example of an instruction for operating addresses on a plurality of banks as in the prior art.

FIG. 7 shows a flowchart showing the process of the shown embodiment. In FIG. 7, when the bank switching instruction is generated at the step 307, and when the instruction is discriminated as the bank switching instruction by one of the discrimination steps, the bank number is stored in the bank information storage portion in place of the symbol, at a step 709. When the statement is the label line as checked at the step 311, the value "−1" is stored in the bank information storage portion 160 instead of the symbol at a step 712. These steps are only differentiated from the process in the foregoing first embodiment as shown in FIG. 3. Other processes are completely the same as those of the first embodiment in FIG. 3. Accordingly, the common processes between FIGS. 3 and 8 are represented by the same step numbers.

Here, the process employing the dedicated bank switching instruction executing discrimination of bank switching with reference to the content of the bank information will be discussed with reference to FIG. 8. Here, there is presented the bank switching discrimination instruction realizing the same process to those to be done by the instruction statements 501 to 507.

At first, as a result of decoding of the instruction statement 901, it is discriminated as the label line. Then, the value "−1" is stored in the bank information storage portion 160. As a result of decoding of the instruction statement 902, the discrimination is made that the statement contains the bank switching discrimination instruction. Then, the bank number stored in the bank information storage portion 160 is read out. In this case, since the read out value is "−1", the bank switching discrimination portion 902 generates the bank switching instruction BANKn for switching the bank number to "n" designated by the instruction statement for operating the content of the data memory, in a straightforward manner. Then, the bank number n designated by the bank switching instruction is stored in the bank information storage portion 160.

The instruction statement 904 is the bank switching discrimination instruction. This instruction is executed to read out the bank information from the bank information storage portion. The value "n" read from the bank information storage portion 160 is compared with the bank number "m" designated by the instruction statement 905. If n=m, the bank switching instruction is not generated. On the other hand, if n≠m, the bank switching instruction is generated for switching the bank number to "m". When the bank switching instruction is generated for switching the bank number to "m", then the bank number "m" is stored in the bank information storage portion 709.

As set forth above, in the shown embodiment, discrimination is made whether bank switching is really required before the instruction statement for operating the content of the designated address in the data memory so that the bank switching instruction is generated only when the bank switching is indeed necessary. Therefore, the bank switching can be realized with a minimum number of instructions to simplify the execution program converted into machine language.

As can be appreciated herefrom, while the bank switching instruction for switching the bank number to that designated by the instruction statement for operating the content of the designated address on the data member is always set before the instruction for operating the content of the address irrespective of whether the bank switching instruction is indeed required or not, in the prior art, the present invention discriminates necessity of switching of the bank and the bank switching instruction is set only when it is really required. Therefore, the bank switching process can be realized with the minimum number of instructions. Also, the program can be significantly simplified.

Although the invention has been illustrated and described with respect an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope encompassed by and equivalents thereof with respect to the features set out in the appended claims.

What is claimed is:

1. A language processing system for a computer system having a data memory divided into a plurality of banks designated by bank numbers, a bank in use at any given time being known as a current bank, the language processing system converting a source program described by a program language into a computer executable machine language, the source program including a bank switching instruction for switching the bank number used to designate the current bank, the computer system handling data in the data memory, each location in the data memory being designated by a bank number and an address, said system comprising:

means for reading a statement of said source program;

bank information storage means for storing the bank number designating the current bank;

bank information setting means for determining when the statement is said bank switching instruction and for storing a bank number designated by the bank switching instruction;

bank information discriminating means operative when the statement is an instruction statement for handling the data of a data memory location, for reading out the content of said bank information storage means and comparing the current bank number and the bank number designated by the instruction statement;

bank switching instruction generating means for generating the bank switching instruction to switch the current bank number in the bank information storage means to the bank number designated by said instruction statement when the bank information discriminating means determines that the current bank number and the bank number designated by the instruction statement are different; and converting means for converting the statement of said source program and said generated bank switching instruction into the computer executable machine language.

2. A language processing system as set forth in claim 1, wherein said bank information storage means further comprises:
a symbol storage portion for storing a symbol name and a value thereof.

3. A language processing system as set forth in claim 1, wherein said bank information storage means is a dedicated storage area for storing the bank information.

4. A language processing system as set forth in claim 1, wherein said source program contains conditional assembly pseudo instructions and said bank information discriminating means and said bank switching instruction generating means are realized by executing said conditional assembly pseudo instructions.

5. A language processing system for a computer system having a data memory divided into a plurality of banks designated by bank numbers, a bank in use at any given time being known as a current bank, the language processing system converting a source program described by a program language into a computer executable machine language, the source program including a bank switching instruction for switching the bank number used to designate the current bank and a branching instruction for branching to an arbitrary label as a target address, the computer system handling data in data memory, each location in the data memory being designated by a bank number and an address, said system comprising:
means for reading a statement of said source program;
bank information storage means for storing the bank number designating the current bank;
bank information setting means for determining when the statement is said bank switching instruction or said label and for storing a bank number designated by the bank switching instruction when the statement is the bank switching instruction and for storing a specific value other than said bank number when said statement is the label;
bank information discriminating means, operative when the read statement is an instruction statement for handling the data of a data memory location, for reading out the content of said bank information storage means and comparing the current bank number and the bank number designated by the instruction statement;
bank switching instruction generating means for generating the bank switching instruction to switch the current bank number in the bank information storage means to the bank number designated by said instruction statement when the bank information discriminating means determines that the current bank number and the bank number designated by the instruction statement are different; and
converting means for converting the statement of said source program and said generated bank switching instruction into the computer executable machine language.

6. A language processing system as set forth in claim 5, wherein said bank information storage means further comprises:
a symbol storage portion for storing a symbol name and a value thereof.

7. A language processing system as set forth in claim 5, wherein said bank information storage means is a dedicated storage area for storing the bank information.

8. A language processing system as set forth in claim 5, wherein said source program contains conditional assembly pseudo instructions and said bank information discriminating means and said bank switching instruction generating means are realized by executing said conditional assembly pseudo instructions.

9. A language processing method for converting a source program described by a program language into a computer executable machine language, said source program including a bank switching instruction for switching a bank number designating a current memory bank from a plurality of banks in a data memory of a computer system, each location in the data memory being designated by a bank number and an address in the bank designated by the bank number, said method comprising the steps of:
reading a statement of said source program;
storing the bank number designating the current bank;
determining whether the statement is said bank switching instruction and storing a bank number designated by the bank switching instruction when the statement is the bank switching instruction;
when the statement is an instruction statement for handling the data of a data memory location, reading out the stored information and comparing the current bank number and the bank number designated by the instruction statement;
generating the bank switching instruction to switch the current bank number to the bank number designated by said instruction statement when the current bank number and the bank number designated by the instruction statement are found to be different; and
converting the statement of said source program and said generated bank switching instruction into the computer executable machine language.

* * * * *